United States Patent
Shin et al.

(10) Patent No.: US 12,495,225 B2
(45) Date of Patent: Dec. 9, 2025

(54) SENSOR INCLUDING MICRO LENSES OF DIFFERENT SIZES

(71) Applicant: SK hynix Inc., Icheon-si (KR)

(72) Inventors: Min Seok Shin, Icheon-si (KR); Seong Hee Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 244 days.

(21) Appl. No.: 18/339,115

(22) Filed: Jun. 21, 2023

(65) Prior Publication Data

US 2024/0205560 A1    Jun. 20, 2024

(30) Foreign Application Priority Data

Dec. 14, 2022    (KR) .................. 10-2022-0174344

(51) Int. Cl.
*H04N 25/704* (2023.01)
*H04N 23/67* (2023.01)
*H04N 25/11* (2023.01)

(52) U.S. Cl.
CPC ......... *H04N 25/704* (2023.01); *H04N 23/672* (2023.01); *H04N 25/11* (2023.01)

(58) Field of Classification Search
CPC .... H04N 25/704; H04N 23/672; H04N 25/11; H04N 25/134; H04N 23/67; H04N 23/54; H04N 23/55; G03B 13/36; H10F 39/8023; H10F 39/8053; H10F 39/8063
See application file for complete search history.

(56) References Cited

U.S. PATENT DOCUMENTS

| | | | |
|---|---|---|---|
| 11,683,598 B1* | 6/2023 | Mu | H04N 23/634 348/207.99 |
| 2022/0165766 A1* | 5/2022 | Jeong | H10F 39/807 |
| 2022/0181372 A1* | 6/2022 | Lee | H04N 25/704 |
| 2022/0190023 A1* | 6/2022 | Jeong | H10F 39/8053 |

FOREIGN PATENT DOCUMENTS

| KR | 1020200037698 A | 4/2020 |
|---|---|---|
| KR | 1020210155344 A | 12/2021 |

* cited by examiner

*Primary Examiner* — Gevell V Selby
(74) *Attorney, Agent, or Firm* — WILLIAM PARK & ASSOCIATES LTD.

(57) ABSTRACT

According to an embodiment of the present disclosure, a pixel array includes a first pixel group corresponding to two or more pixels, each including a color filter corresponding to a first color, and a second pixel group corresponding to two or more pixels, each including a color filter corresponding to a second color, the second color being different from the first color, and a first pixel, among pixels corresponding to the first pixel group, and a second pixel, among pixels corresponding to the second pixel group, are disposed adjacent to each other and share a micro lens having a first size.

14 Claims, 10 Drawing Sheets

SENSOR INCLUDING MICRO LENSES OF DIFFERENT SIZES

CROSS-REFERENCE TO RELATED APPLICATION

The present application claims priority under 35 U.S.C. § 119(a) to Korean patent application number 10-2022-0174344 filed on Dec. 14, 2022, in the Korean Intellectual Property Office, the entire disclosure of which is incorporated by reference herein.

BACKGROUND

1. Technical Field

The present disclosure relates to a technique for performing phase detection auto focus (PDAF) using an image sensor including micro lenses of different sizes.

2. Related Art

Auto focus (AF) is a function of adjusting focus when capturing an image and includes a contrast AF method and a phase detection AF (PDAF) method. The contrast AF method is a method of finding a position of a lens with the highest visibility, among captured images, while moving the lens, and the PDAF method is a method of determining a position of a lens using each data obtained by separating incident light passing through the lens, for example, a phase difference between left data and right data.

SUMMARY

According to an embodiment of the present disclosure, a pixel array may include a first pixel group corresponding to two or more pixels, each including a color filter corresponding to a first color, and a second pixel group corresponding to two or more pixels, each including a color filter corresponding to a second color, the second color being different from the first color, and a first pixel, among pixels corresponding to the first pixel group, and a second pixel, among pixels corresponding to the second pixel group, may be disposed adjacent to each other and may share a micro lens having a first size.

According to an embodiment of the present disclosure, an electronic device may include an image sensor including a plurality of pixel groups, each including a phase detection pixel and an image detection pixel, wherein each of first phase detection pixels and first image detection pixels included in pixel groups corresponding to a first color, among the plurality of pixel groups, includes a color filter of the first color, and each of the first phase detection pixels shares a micro lens having a first size together with a second phase detection pixel included in a pixel group corresponding to a second color, the second color being different from the first color and the second phase detection pixel being adjacent to each of the first phase detection pixels, and an image processor configured to control auto focus (AF) based on phase difference data obtained from the first phase detection pixels of the pixel groups corresponding to the first color.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Hereinafter, embodiments of the present disclosure will be described with reference to the accompanying drawings in order to describe in detail enough to allow those of ordinary skill in the art to easily implement the technical idea of the present disclosure.

An electronic device employing a PDAF method includes an image sensor having a PDAF pattern of a form in which two photodiodes (PDs) having a 1×2 arrangement are disposed under one micro lens. At this time, the PDAF pattern is configured so that two pixels (hereinafter referred to as phase detection pixels) sharing the one micro lens include a color filter corresponding to the same color, such as white or green. The electronic device controls AF using pixel data generated from the phase detection pixel.

However, when the image sensor has the PDAF pattern described above, quality of a captured image is degraded compared to a case in which the phase detection pixel is not included. For example, in a normal mode (or a full mode), the electronic device obtains an image in which pixel data corresponding to a position of the phase detection pixel is processed as a defect. Therefore, an image in which a defect is increased is captured compared to the case in which the phase detection pixel is not included. For another example, in a binning mode (or sum mode), the electronic device obtains an image by summing only pixel data corresponding to a remaining pixel (hereinafter referred to as image detection pixel) other than the phase detection pixel. Therefore, an image in which sensitivity is reduced is captured compared to the case in which the phase detection pixel is not included.

According to the present disclosure, an electronic device may capture an image with improved quality while controlling AF using an image sensor having a PDAF pattern.

Figure 1:
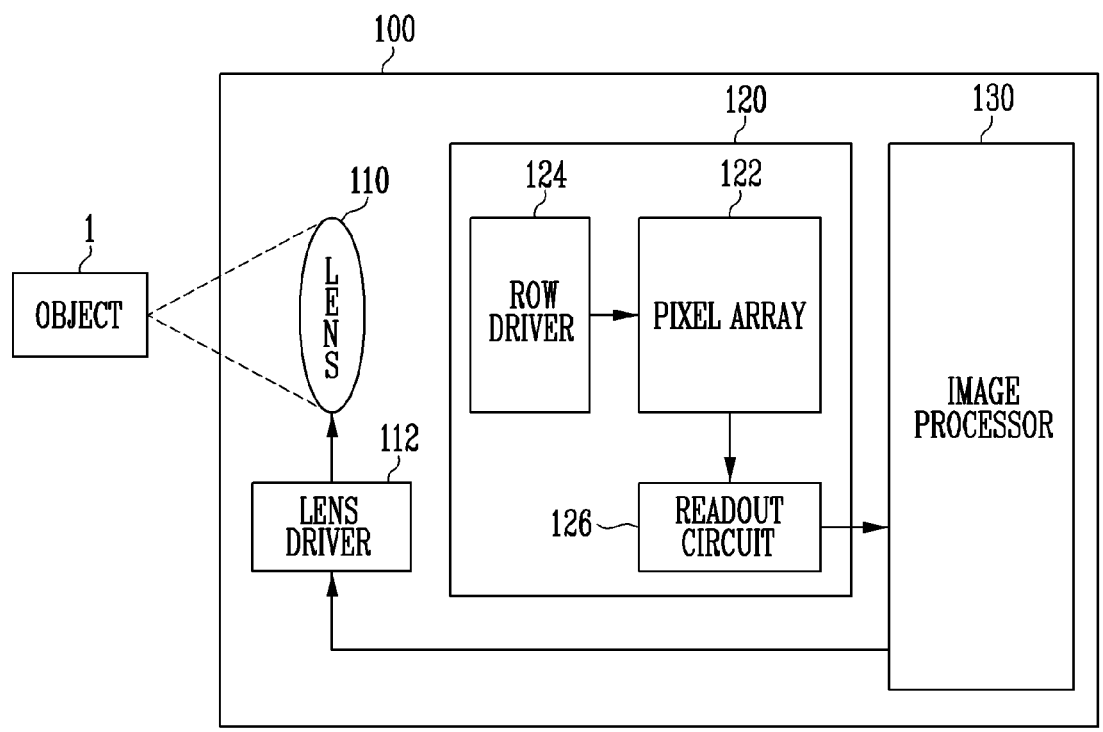
FIG. 1 is a diagram schematically illustrating a configuration of an electronic device according to an embodiment of the present disclosure.

FIG. 1 is a diagram schematically illustrating a configuration of an electronic device according to an embodiment of the present disclosure.

Referring to FIG. 1, the electronic device 100 may include a lens 110, a lens driver 112, an image sensor 120, and an image processor 130. The electronic device 100 may be a device configured to capture an image of an external object 1, such as a smart phone, a camera, or a tablet. Alternatively, the electronic device 100 may be one part, for example, a camera module, included in the devices.

The lens 110 may collect incident light received from outside of the electronic device 100, for example, incident light from the object 1. For example, the lens 110 may collect light emitted or reflected from the object 1 and may focus the light on the image sensor 120. The lens 110 may be configured of a single lens or a plurality of lenses.

The lens driver 112 may adjust a position of the lens 110 under the control of the image processor 130. For example, the lens driver 112 may change focus of the object 1 by controlling the position of the lens 110 and thus may perform an AF function.

The image sensor 120 may include a pixel array 122, a row driver 124, and a readout circuit 126.

The pixel array 122 may convert the light incident from the object 1 through the lens 110 into an electrical signal. The pixel array 122 may include a plurality of pixels arranged in a row direction and a column direction. A detailed structure of the pixel array 122 is described later with reference to FIGS. 2 to 11.

The row driver 124 may select at least one row, among a plurality of rows, included in the pixel array 122. The image sensor 120 may read out pixels included in a specific row, among the plurality of pixels, included in the pixel array 122 under the control of the row driver 124.

The readout circuit 126 may read out pixels selected by the row driver 124, among the plurality of pixels, included in the pixel array 122. The readout circuit 126 may include an analog-digital converter (ADC), and the ADC may convert an analog signal obtained from the plurality of pixels into a digital signal. The readout circuit 126 may provide pixel data obtained by reading out the pixels included in the pixel array 122 and performing digital conversion on readout data to the image processor 130.

The image processor 130 may receive the pixel data from the image sensor 120. The image processor 130 may obtain image data including the pixel data. The image processor 130 may output image data captured through the image sensor 120 to an external device (for example, an application processor (AP), a display, or a memory).

The image processor 130 may also perform the AF function by using the pixel data received from the image sensor 120. For example, the image processor 130 may control AF by using phase difference data obtained through a phase detection pixel, among the pixels, included in the pixel array 122. The image sensor 120 may provide the pixel data obtained by reading out the phase detection pixel to the image processor 130, and the image processor 130 may process the corresponding pixel data to obtain the phase difference data.

The image processor 130 may move the lens 110 to focus on the object 1 by using the phase difference data. For example, the image processor 130 may calculate a distance between the object 1 and the lens 110 for focusing on the object 1 by using the phase difference data and may determine a position of the lens 110 at which the focus may be set on the object 1, based on the distance. The image processor 130 may control the lens driver 112 to move the lens 110 to the determined position.

Hereinafter, in order for the electronic device 100 to perform phase detection auto focus (PDAF) according to the present disclosure, a PDAF pattern of the pixel array 122 and a method of controlling the AF and obtaining the image data through the pixel array 122 by the image processor 130 are described.

Figure 2:
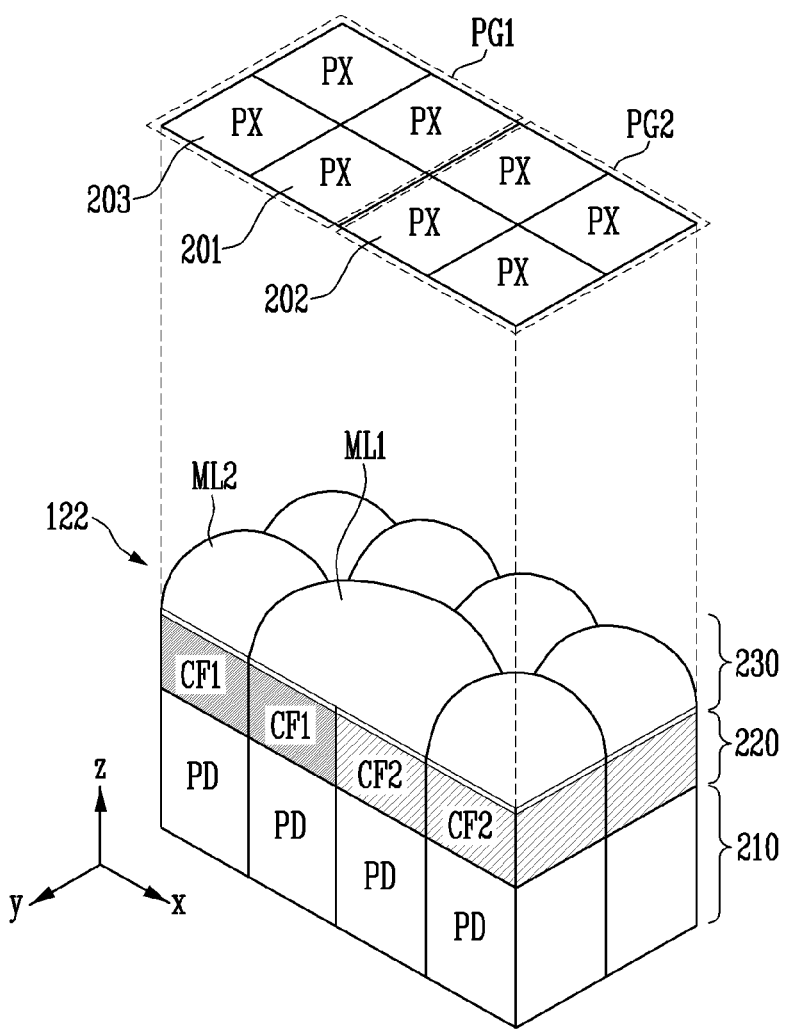
FIG. 2 is a diagram schematically illustrating a configuration of a pixel array according to an embodiment of the present disclosure.

FIG. 2 is a diagram schematically illustrating a configuration of a pixel array according to an embodiment of the present disclosure.

Referring to FIG. 2, the pixel array 122 may include a plurality of pixels PX. In FIG. 2, an x direction may be understood as the row direction, and a y direction may be understood as the column direction. Incident light received from the object 1 may be incident on the pixel array 122 in a −z direction. It may be understood that pixels PX, shown in FIG. 2, are only some of the pixels included in the pixel array 122.

The pixel array 122 may include pixel groups PG1 and PG2, each corresponding to two or more pixels PX. Each of a first pixel group PG1 and a second pixel group PG2 may correspond to two or more pixels PX. For example, each of the first pixel group PG1 and the second pixel group PG2 may include four pixels PX arranged 2×2. However, in FIG. 2, each of the first pixel group PG1 and the second pixel group PG2 is shown as including four pixels PX arranged in 2×2, but this is merely an example and does not limit the scope of the present disclosure. For example, each of the first pixel group PG1 and the second pixel group PG2 may include nine pixels arranged in 3×3 or sixteen pixels arranged in 4×4.

When a configuration of the pixel array 122 is divided along a z-axis, the pixel array 122 may include a photoelectric conversion area array 210 including photoelectric conversion elements PD, a color filter array 220 including color filters CF1 and CF2 disposed on the photoelectric conversion area array 210, and a micro lens array 230 including a micro lens ML1 having a first size and a micro lens ML2 having a second size.

The photoelectric conversion area array 210 may include a plurality of photoelectric conversion elements PD. The photoelectric conversion element PD may include a photodiode, a photo transistor, a photo gate, a pinned photodiode (PPD), or a combination thereof. Hereinafter, the present disclosure is described under an assumption that the photoelectric conversion element PD is a photodiode as an example.

The photoelectric conversion elements PD may be disposed to be included in each of arbitrary pixels PX. The photoelectric conversion element PD may generate a photocharge corresponding to incident light passing through the micro lens array 230 and the color filter array 220. The readout circuit 126 of FIG. 1 may obtain the pixel data by reading out the photoelectric conversion elements PD. For example, the readout circuit 126 may read out each of the photoelectric conversion elements PD or may sum and read out at least some of the pixels PX included in one pixel group PG1 or PG2.

The photoelectric conversion elements PD included in one pixel group may share floating diffusion (FD). For example, four photoelectric conversion elements PD included in the first pixel group PG1 may be connected to one FD. The image sensor 120 may move a charge accumulated in the photoelectric conversion elements PD to the FD and may obtain an analog signal corresponding to a charge amount moved to the FD. In a normal mode, the image sensor 120 may obtain pixel data corresponding to each photoelectric conversion element PD by moving the charge accumulated for each photoelectric conversion element PD to the FD. In a binning mode, the image sensor 120 may obtain pixel data corresponding to each of the pixel groups PG1 and PG2 by moving the charge accumulated in two or more photoelectric conversion elements PD together with the FD.

The color filter array 220 may include color filters CF1 and CF2 that selectively pass incident light according to a wavelength. For example, the color filter CF1 corresponding to a first color may pass light of the first color, among the incident light, and might not pass light of other colors. The color filter CF1 corresponding to the first color may be referred to as a first color of color filter CF1.

The color filter array 220 may include color filters CF1 and CF2 corresponding to different colors for each pixel group PG1 and PG2. One pixel group PG1 or PG2 may include color filters CF1 and CF2 corresponding to the same color. For example, the first pixel group PG1 may include a color filter CF1 corresponding to a first color, and the second pixel group PG2 may include a color filter CF2 corresponding to a second color. In the present disclosure, the first pixel group PG1 including the color filter CF1 corresponding to the first color may be referred to as the first pixel group PG1 corresponding to the first color.

The color filters CF1 and CF2 may be individually manufactured for each pixel PX or may be manufactured for each pixel group PG1 and PG2. For example, the first pixel group PG1 may include four color filters CF1 corresponding to the number of pixels PX and may also include one color filter CF1 of a size that may cover the four pixels PX. Hereinafter, for convenience of description, the present disclosure is described based on a premise that each pixel PX includes one color filter CF1 or CF2.

The color filters CF1 and CF2 included in the color filter array 220 may have various color patterns. For example, the first color of the color filter CF1 may correspond to R (the color red), and the second color of color filter CF2 may correspond to G (the color green). For another example, the first color of the color filter CF1 may correspond to G, and the second color of the color filter CF2 may correspond to B (the color blue). Although the present disclosure is described based on a premise that a color pattern of the color filter array 220 is an RGGB pattern, this is an example and does not limit the scope of the present disclosure. For example, the color pattern of the color filter array 220 may be a CMY pattern or an RGBW pattern.

The micro lens array 230 may include micro lens ML1 having a first size and micro lens ML2 having a second size. The micro lens array 230 may control a path of incident light incident on the image sensor 120. The micro lenses ML1 and ML2 may condense the incident light incident on the pixel array 122 to the corresponding color filters CF1 and CF2 and the photoelectric conversion elements PD, respectively.

A first pixel 201, among pixels, corresponding to the first pixel group PG1 and a second pixel 202, among pixels corresponding to the second pixel group PG2, may be disposed to be adjacent to each other and may share the micro lens ML1 having the first size. Two or more pixels sharing one micro lens may mean that each of the pixels PX adjacent in the row direction and/or the column direction includes a portion of one micro lens. For example, each of the first pixel 201 and the second pixel 202 may include a portion of the micro lens ML1 having the first size.

In addition, pixels PX (for example, a third pixel 203) other than the first pixel 201, among the pixels corresponding to the first pixel group PG1, and pixels PX other than the second pixel 202, among the pixels corresponding to the second pixel group PG2, may include micro lens ML2 having the second size.

The micro lens ML1 having the first size may be disposed to cover the color filter CF1 included in the first pixel 201 and the color filter CF2 included in the second pixel 202. The second size of micro lens ML2 may be disposed to cover the color filter CF1 included in the third pixel 203. The second size of micro lens ML2 may be less than the first size of the micro lens ML1. For example, assuming that the pixel array 122 is viewed in a z-axis direction, the area of micro lens ML1 having the first size may be about twice that of micro lens ML2 having the second size. However, although the micro lens ML1 having the first size is shown as covering two pixels PX in FIG. 2, the micro lens ML1 having the first size may be configured to cover four pixels PX. An embodiment in which the micro lens ML1 is configured to have a size that covers four pixels PX is described later with reference to FIG. 6 and a subsequent figure.

In the present disclosure, the pixels (for example, the first pixel 201 and the second pixel 202) sharing the micro lens ML1 having the first size may be referred to as phase detection pixels, and pixels (for example, the third pixel 203) other than the phase detection pixels may be referred to as image detection pixels. Therefore, the first pixel 201 and the second pixel 202 sharing the micro lens ML1 having the first size may be referred to as a first phase detection pixel including the color filter CF1 of the first color and a second phase detection pixel including the color filter CF2 of the second color sharing the micro lens ML1 having the first size.

According to the present disclosure, the electronic device 100 may control the AF and may obtain the image data using the pixel array 122 having the structure, shown in FIG. 2. The image processor 130 may perform the PDAF by using the pixel data received from the image sensor 120 and may obtain image data with improved quality compared to the prior art.

The image processor 130 may control the AF based on the phase difference data obtained from the phase detection pixels (for example, the first pixel 201 and the second pixel 202). For example, the image sensor 120 may obtain a first type of pixel data by reading out the phase detection pixel and may provide the first type of pixel data to the image processor 130. The image processor 130 may receive the first type of pixel data from the image sensor 120 and may obtain the phase difference data based on the first type of pixel data. In the present disclosure, the first type of pixel data may indicate pixel data generated from the phase detection pixel.

An operation of controlling the AF by the image processor 130 is described in more detail as follows. The image processor 130 may generate first phase data for the object 1 by calculating pixel data generated from pixels (for example, the first pixel 201) positioned on a first side (for example, a left side) of the micro lens ML1 having the first size, among the phase detection pixels. Similarly, the image processor 130 may generate second phase data for the object 1 by calculating pixel data generated from pixels (for example, the second pixel 202) positioned on a second side (for example, a right side) of the micro lens ML1 having the first size, among the phase detection pixels. At this time, when a distance between the lens 110 and the object 1 is not an in-focus position, a phase difference may occur between the first phase data and the second phase data. Therefore, the image processor 130 may move the lens 110 in a direction in which the phase difference between the first phase data and the second phase data decreases.

However, according to the present disclosure, two or more pixels sharing a micro-lens ML1 having a first size may include color filters of different colors. For example, the color filters included in the first pixel 201 and the second pixel 202 may correspond to the first color and the second color, respectively. In the present disclosure, phase detection pixels corresponding to different colors may be arranged to share one micro lens ML1 having the first size, and thus the image sensor 120 in which the phase detection pixels are uniformly disposed on the pixel array 122 may be manufactured.

Therefore, the image processor 130 may control the AF by using the pixel data obtained through the phase detection pixels including the color filters of the same color among the phase detection pixels. For example, the image processor 130 may control the AF by using the phase difference data related to the first color obtained from the first phase detection pixels (for example, the first pixel 201) including the color filter CF1 of the first color. In addition, the image processor 130 may control the AF by using the phase difference data related to the second color obtained from the second phase detection pixels (for example, the second pixel 202) including the color filter CF2 of the second color. The phase detection pixels used by the image processor 130 to control AF is described later in more detail with reference to FIG. 3.

The image processor 130 may obtain the image data based on the pixel data received from the phase detection pixels (for example, the first pixel 201 and the second pixel 202) and the image detection pixels (for example, the third pixel 203). For example, the image sensor 120 may obtain the first type of pixel data by reading out the phase detection pixels and may obtain the second type of pixel data by reading out the image detection pixels. The image sensor 120 may provide the first type of pixel data and the second type of pixel data to the image processor 130. The image processor 130 may obtain the image data by using the first type of pixel data and the second type of pixel data together. For example, the image processor 130 may generate the image data including the first type of pixel data and the second type of pixel data. In the present disclosure, the second type of pixel data may indicate the pixel data generated from the image detection pixels.

According to the present disclosure, since the image data is obtained by using the first type of pixel data as well as the second type of pixel data, quality of the image data may be improved compared to the prior art. For example, the existing PDAF pattern is configured so that phase detection pixels sharing one micro lens include a color filter of the same color (for example, W (white)). In this case, when the phase detection pixels include the color filter of the same color, quality of a captured image is degraded. For example, in a normal mode (or a full mode), the electronic device obtains an image in which pixel data corresponding to a position of the phase detection pixel is processed as a defect. In addition, in a binning mode (or a sum mode), the electronic device obtains an image by summing only a remaining pixel other than the phase detection pixels, that is, pixel data corresponding to an image detection pixel (for example, 7 sum data and 8 sum data).

However, comparing the existing PDAF pattern with the PDAF pattern according to the present disclosure, each of the phase detection pixels may also include the color filters (for example, CF1 and CF2) corresponding to a specific color. For example, the micro lens ML1 having the first size may be disposed to cover two or more phase detection pixels (for example, the first pixel 201 included in the first pixel group PG1 and the second pixel 202 included in the second pixel group PG2) included in different pixel groups and adjacent to each other, among the phase detection pixels. Therefore, the image processor 130 may also use the pixel data (or the first type of pixel data) obtained from the phase detection pixel to generate the image data.

Therefore, compared to processing the pixel data of the phase detection pixels as the defect in the normal mode, the electronic device 100 may obtain the image data in which a defect is reduced. In addition, compared to obtaining the image data by using only the pixel data of the image detection pixel in the binning mode, the electronic device 100 may obtain the image data including the pixel data generated from the image detection pixels and the pixel data generated from the phase detection pixels together (for example, 9 sum data). Therefore, according to the present disclosure, an image with improved quality compared to the prior art may be captured while controlling the AF using the image sensor 120 having the PDAF pattern.

FIGS. 3 to 11 list various examples of the PDAF pattern of the image sensor 120 according to the present disclosure and a method of controlling the AF and obtaining the image data by using the corresponding PDAF patterns. FIGS. 3 to 11 show the pixels PX and the micro lens ML1 having the first size, among views of the pixel array 122 viewed from a +z direction, and it may be understood that the second size of micro lens ML2 is not shown.

Figure 3:
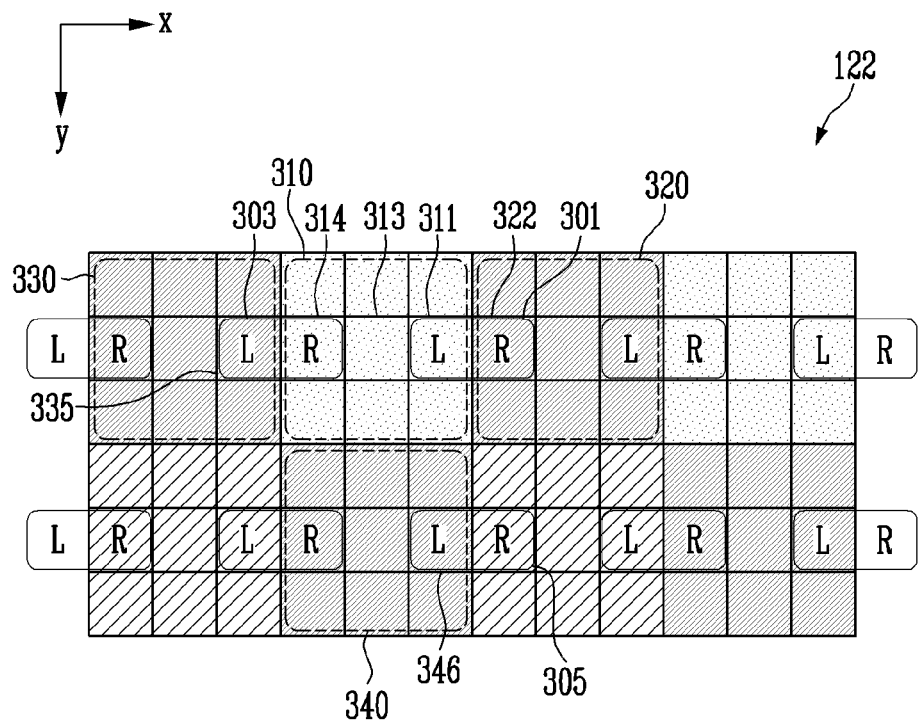
FIG. 3 is a diagram illustrating an example of a pixel array in which pixels arranged in 1×2 share a micro lens according to an embodiment of the present disclosure.

FIG. 3 is a diagram illustrating an example of a pixel array in which pixels arranged in 1×2 share a micro lens according to an embodiment of the present disclosure. A first pixel group 310 of FIG. 3 may correspond to the first pixel group PG1 of FIG. 2, a second pixel group 320 of FIG. 3 may correspond to the second pixel group PG2 of FIG. 2, a first pixel 311 of FIG. 3 may correspond to the first pixel 201 of FIG. 2, a second pixel 322 of FIG. 3 may correspond to the second pixel 202 of FIG. 2, a third pixel 313 of FIG. 3 may correspond to the third pixel 203 of FIG. 2, and micro lenses 301, 303, and 305 having a first size of FIG. 3 may correspond to the micro lens ML1 having the first size of FIG. 2.

Referring to FIG. 3, the pixel array 122 may include pixel groups each corresponding to nine pixels arranged in 3×3. For example, the first pixel group 310 may include nine pixels, each including a color filter corresponding to B, and the second pixel group 320 may include nine pixels, each including a color filter corresponding to G.

The first pixel 311, among pixels corresponding to the first pixel group 310, and the second pixel 322, among pixels corresponding to the second pixel group 320, may be pixels adjacent to each other. For example, the first pixel 311 and the second pixel 322 may be two pixels adjacent to each other in the row direction.

The first pixel 311 and the second pixel 322 may share the micro lens 301 having the first size. For example, the first pixel 311 may include a portion of the micro lens 301 having the first size, and the second pixel 322 may also include another portion of the micro lens 301 having the first size. The first pixel 311 and the second pixel 322 sharing the micro lens 301 having the first size may be referred to as the phase detection pixels. In addition to the first pixel 311 and the second pixel 322, pixels sharing the micro lens having the first size in FIG. 3 may be referred to as the phase detection pixels.

Although not shown in FIG. 3, among the pixels included in the first pixel group 310, the third pixel 313 may include the micro lens having a second size (for example, ML2 of FIG. 2). Among the pixels shown in FIG. 3, pixels that are not shown as sharing the micro lens having the first size may be understood to include the micro lens having the second size. The pixels (for example, the third pixel 313) including the micro lens having the second size may be referred to as the image detection pixels.

In FIG. 3, when the second pixel group 320 is positioned in the first direction (for example, on a right side or in a +x direction) of the first pixel group 310, the pixel array 122 may further include a third pixel group 330 corresponding to nine pixels including a color filter corresponding to G and positioned in a second direction (for example, on a left side or a −x direction) opposite to the first direction with respect to the first pixel group 310.

A fourth pixel 314, among pixels corresponding to the first pixel group 310, and a fifth pixel 335, among pixels corresponding to the third pixel group 330, may be disposed adjacent to each other and may share the micro lens 303 having the first size.

The image processor 130 according to the present disclosure may obtain the image data by using the phase detection pixels as well as the image detection pixels. As described with reference to FIG. 2, according to the existing PDAF pattern, it may be difficult to include the pixel data of the phase detection pixels may be difficult in the image data, but the image processor 130 of the present disclosure may obtain the image data including the pixel data of the phase detection pixel.

In the normal mode (or the full mode), the image sensor 120 may read out each of the pixels included in the pixel array 122 and may provide the obtained pixel data to the image processor 130. For example, the image sensor 120 may read out each of the nine pixels included in the first pixel group 310 and may provide pixel data corresponding to each of the pixels to the image processor 130. The image processor 130 may control the AF based on L data that is pixel data of the first pixel 311 and R data that is pixel data of the fourth pixel 314, among the pixel data received from the image sensor 120. In addition, the image processor 130 may obtain image data including all pixel data corresponding to each of the nine pixels. However, in a case of the phase detection pixel, since a shape of the micro lens is different from that of the image detection pixel, sensitivity may vary, and thus, the image processor 130 may correct the pixel data of the phase detection pixel by using a correction value stored in advance. The image processor 130 may obtain the image data based on data obtained by correcting the pixel data of the image detection pixel and the pixel data of the phase detection pixel.

In a first binning mode, the image sensor 120 may reduce the number of times the pixel array 122 is read out compared to the normal mode. For example, after resetting the first pixel group 310, the image sensor 120 may read out reset data, read out L data corresponding to a charge generated in the first pixel 311, read out L+R data obtained by adding a charge generated in the fourth pixel 314 to the L data, and read out 9 sum data obtained by adding a charge generated in the remaining seven pixels. The image sensor 120 may provide the reset data, the L data, the L+R data, and the 9 sum data to the image processor 130. The image processor 130 may control the AF by using (L data)−(reset data) and (L+R data)−(L data)−(reset data), and obtain the image data by using (9 sum data)−(reset data). At this time, an operation of subtracting the reset data may be correlated double sampling (CDS) and may be performed by the readout circuit 126 of the image sensor 120 or by the image processor 130.

In a second binning mode, the image sensor 120 may increase a frame rate by further reducing the number of times the pixel array 122 is read out compared to the first binning mode. The image sensor 120 may read out any one of the L data or the R data for each row of the pixel array 122. For example, the image sensor 120 may read out the reset data, the L data, and the 9 sum data from a pixel group of a first row and may read out the reset data, the R data, and the 9 sum data from a pixel group of a second row. In this case, the image processor 130 may control the AF by using (L data)−(reset data) and (R data)−(reset data) and may obtain the image data by using (9 sum data)−(reset data).

The image processor 130, according to the present disclosure, may control the AF based on the phase difference data obtained from the phase detection pixels corresponding to the same color (for example, R, G, or B). The phase difference data may indicate the phase difference calculated by the image processor 130 based on the L data and the R data. The image processor 130 may control the AF by using the phase difference data obtained from the phase detection pixels included in one pixel group or may control the AF by using the phase difference data obtained from the phase detection pixels corresponding to the same color but included in different pixel groups.

In the normal mode or the first binning mode, the image processor 130 may control the AF by using two or more phase detection pixels included in any one pixel group. For example, the image processor 130 may control the AF based on the first pixel 311 and the fourth pixel 314 rather than controlling the AF based on the first pixel 311 and the second pixel 322. A pixel sharing the micro lens 301 having the first size with the first pixel 311 may be the second pixel 322, but a color filter included in the first pixel 311 and a color filter included in the second pixel 322 may correspond to different colors, and thus, calculating the phase difference may be difficult. Therefore, controlling the AF by using the first pixel 311 and the second pixel 322 through the image processor 130 may be difficult. Therefore, the image processor 130 may control the AF by using the phase difference between the L data of the first pixel 311 and the R data of the fourth pixel 314 rather than the phase difference between the L data of the first pixel 311 and the R data of the second pixel 322. The image processor 130 may control the AF by using the L data that is pixel data of the first pixel 311 disposed on a left side of the micro lens 301 having the first size and the R data that is pixel data of the fourth pixel 314 disposed on a right side of the micro lens 303 having the first size, among the pixels included in the first pixel group 310 corresponding to the first color.

In the second binning mode, the image processor 130 may control the AF by using the phase detection pixels corresponding to the same color but included in different pixel groups. In the second binning mode, since any one of the L data or R data may be read out according to a row, the image processor 130 may control the AF by using the phase detection pixels included in different pixel groups. For example, each of the second pixel group 320 and the fourth pixel group 340 may correspond to G but may be different pixel groups. The image processor 130 may control the AF by using the second pixel 322 included in the second pixel group 320 and a sixth pixel 346 included in the fourth pixel group 340. The image processor 130 may control the AF by using the L data that is pixel data of the sixth pixel 346 disposed on a left side of the micro lens 305 having the first size and the R data that is pixel data of the second pixel 322 disposed on a right side of the micro lens 301 having the first size.

That is, the image processor 130 may control the AF by using the phase detection pixels including the color filter of the same color regardless of whether the phase detection pixels share one micro lens or whether the phase detection pixels are included in one pixel group. In addition, the image processor 130 may also control the AF by using the phase difference data (the phase difference data related to the first color) obtained from the phase detection pixels including the color filter of the first color and the phase difference data (the phase difference data related to the second color) obtained from the phase detection pixels including the color filter of the second color together.

Figure 4:
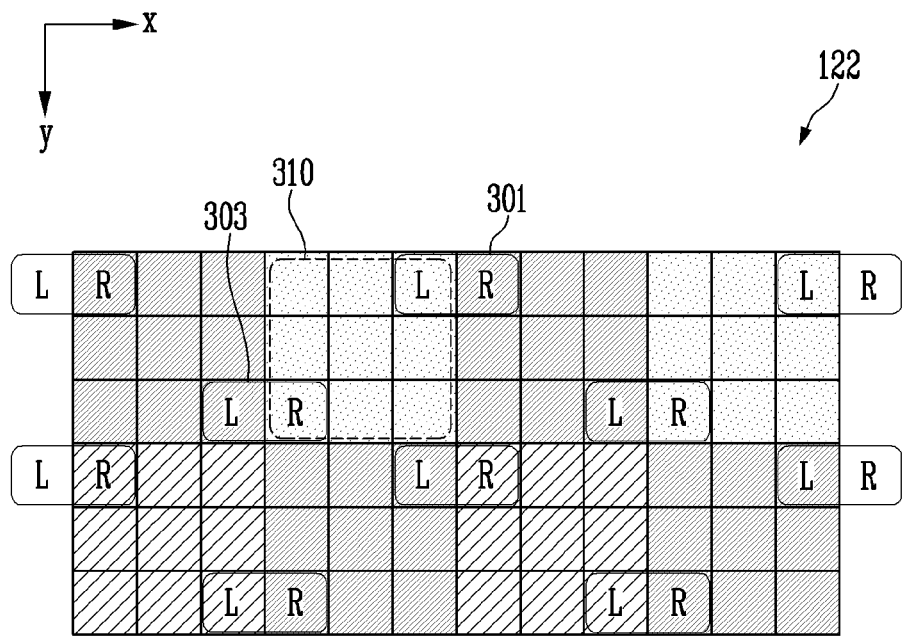
FIG. 4 is a diagram illustrating another example of a pixel array in which pixels arranged in 1×2 share a micro lens according to an embodiment of the present disclosure.

FIG. 4 is a diagram illustrating another example of a pixel array in which pixels arranged in 1×2 share a micro lens according to an embodiment of the present disclosure.

Comparing FIG. 4 with FIG. 3, FIG. 4 may be similar to FIG. 3 except for a position at which the micro lenses having the first size are arranged. Therefore, a description of FIG. 4 mainly focuses on its difference from FIG. 3, and portions of FIG. 4 that are similar to FIG. 3 are either briefly described or omitted.

Comparing positions at which the first pixel group 310 and the micro lenses 301 and 303 having the first size are arranged in FIGS. 3 and 4, the micro lenses 301 and 303 having the first size may be arranged in the same row (for example, a second row among three rows) in FIG. 3, but the micro lenses 301 and 303 having the first size may be arranged in different rows in FIG. 4 (for example, a third row and a first row among the three rows). That is, the phase detection pixels included in the first pixel group 310 may be included in the same row in FIG. 3, but the phase detection pixels included in the first pixel group 310 may be included in different rows in FIG. 4.

Furthermore, the phase detection pixels may be uniformly disposed in the pixel array 122 in a case in which the micro lenses having the first size are arranged as shown in FIG. 4 as well as a case in which the micro lenses having the first size are arranged as shown in FIG. 3.

In addition, in the case of FIG. 4, since the phase detection pixels are positioned in different rows in the first pixel group 310, the image processor 130 may obtain more stable image data. For example, in the case of FIG. 4, differently from FIG. 3, two image detection pixels may be positioned in each of the first row and the third row of the first pixel group 310. Therefore, in a case in which only one image detection pixel is positioned in a specific row in one pixel group, quality of a captured image may be degraded when a defect occurs in a corresponding image detection pixel. In a case in which two or more image detection pixels are positioned for each one row in one pixel group as shown in FIG. 4, a level of reduction of quality of a captured image may be relatively reduced even when a defect occurs in the image detection pixel.

Figure 5:
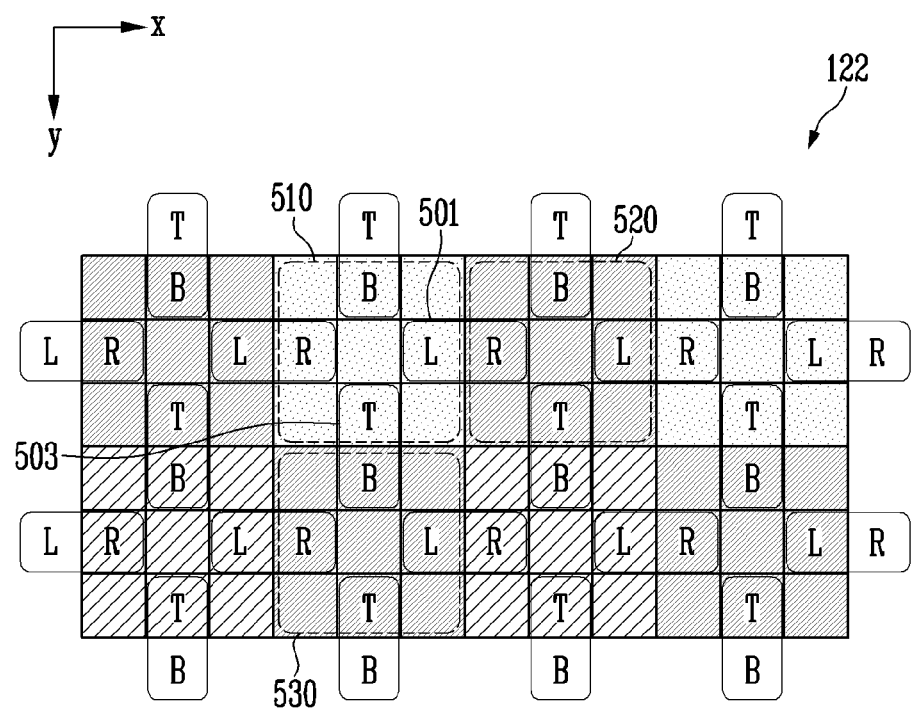
FIG. 5 is a diagram illustrating an example of a pixel array in which pixels arranged in 1×2 and pixels arranged in 2×1 share a micro lens according to an embodiment of the present disclosure.

FIG. 5 is a diagram illustrating an example of a pixel array in which pixels arranged in 1×2 and pixels arranged in 2×1 share a micro lens according to an embodiment of the present disclosure. A first pixel group 510 of FIG. 5 may correspond to the first pixel group PG1 of FIG. 2, a second pixel group 520 of FIG. 5 may correspond to the second pixel group PG2 of FIG. 2, and micro lenses 501 and 503 having the first size of FIG. 5 may correspond to the micro lens ML1 having the first size of FIG. 2.

Comparing FIG. 5 with FIG. 3, FIG. 5 may be similar to FIG. 3 except that micro lenses having the first size are added. Therefore, a description of FIG. 5 mainly focuses on its difference from FIG. 3, and portions of FIG. 5 that are similar to FIG. 3 are either briefly described or omitted.

Comparing a pixel array 122 of FIG. 5 with that of FIG. 3, the pixel array 122 may further include a micro lens 503 having a first size shared by two pixels adjacent in the column direction in addition to a micro lens 501 having a first size shared by two pixels adjacent in the row direction. For example, a pixel positioned in a second row and a third column, among nine pixels included in the first pixel group 510, and a pixel positioned in a second row and a first column, among nine pixels included in the second pixel group 520, may be adjacent to the left and right and may share the micro lens 501 having the first size. In addition, a pixel positioned in a third row and a second column, among the nine pixels included in the first pixel group 510, and a pixel positioned in a first row and a second column, among the nine pixels included in the third pixel group 530, may be adjacent vertically and may share the micro lens 503 having the first size.

When the pixel array 122 has a PDAF pattern shown in FIG. 5, PDAF control performance of the electronic device 100 may be improved compared to the PDAF pattern of FIG. 3 or 4. The image processor 130 may detect a phase difference in a left and right direction by using phase detection pixels adjacent in the row direction and may detect a phase difference in an up and down direction by using phase detection pixels adjacent in the column direction. Therefore, AF performance may be improved when the AF is controlled by using the phase difference of the left and right direction and the phase difference of the up and down direction together compared to a case in which the AF is controlled by using the phase difference of any one of the left and right direction or the up and down direction.

In the first binning mode, the image sensor 120 may obtain reset data, L data, L+R data, L+R+T data, L+R+T+B data, and 9 sum data from the first pixel group 510 and may provide the L data, the L+R data, the L+R+T data, the L+R+T+B data, and the 9 sum data to the image processor 130. The image processor 130 may control the AF by using (L data)−(reset data), (L+R data)−(L data)−(reset data), (L+R+T data)−(L+R data)−(reset data), and (L+R+T+B data)−(L+R+T data)−(reset data) and may obtain the image data by using (9 sum data)−(reset data).

In the second binning mode, the image sensor 120 may read out any one of L data, R data, T data, or B data for each row of the pixel array 122. For example, the image sensor 120 may read out the reset data, the L data, and the 9 sum data from the pixel group of the first row (for example, the first pixel group 510 and the second pixel group 520), read out the reset data, the R data, and the 9 sum data from the pixel group of the second row (for example, the third pixel group 530), read out the reset data, the T data, and the 9 sum data from the pixel group of the third row, and read out the reset data, the B data, and the 9 sum data from the pixel group of the fourth row. In this case, the image processor 130 may control the AF by using (L data)−(reset data), (R data)−(reset data), (T data)−(reset data), and (B data)−(reset data) and may obtain the image data by using (9 sum data)−(reset data).

In the present disclosure, a pixel of a specific row may indicate a row the pixel is included in based on pixels. In addition, in the present disclosure, a pixel group of a specific row may indicate a row in which the pixel is included based on the pixel groups. For example, in FIG. 5, the pixel group of the first row may include pixels of the first row, pixels of the second row, and pixels of the third row.

Figure 6:
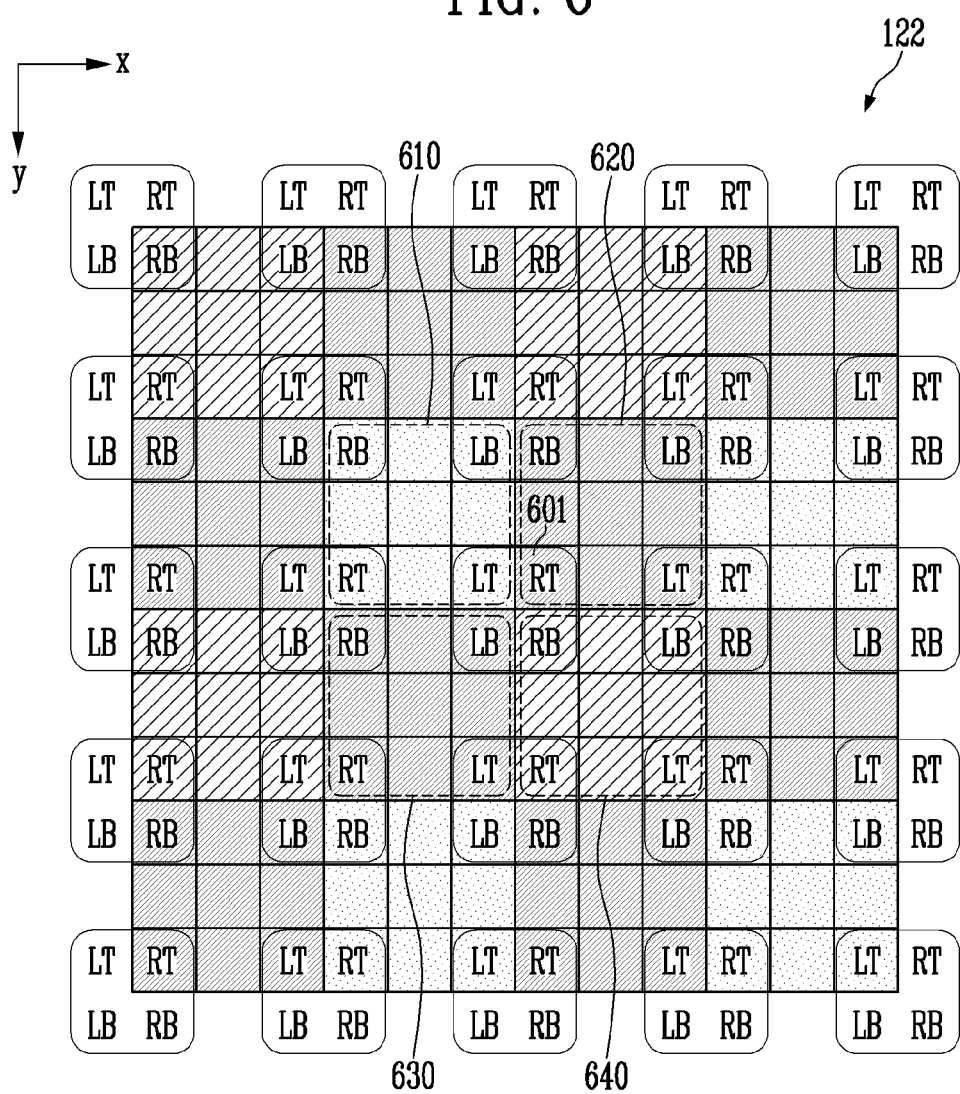
FIG. 6 is a diagram illustrating an example of a pixel array in which pixels arranged in 2×2 share a micro lens according to an embodiment of the present disclosure.

FIG. 6 is a diagram illustrating an example of a pixel array in which pixels arranged in 2×2 share a micro lens according to an embodiment of the present disclosure. Pixel groups 610, 620, 630, and 640 of FIG. 6 may correspond to the pixel groups PG1 and PG2 of FIG. 2, and a micro lens 601 having a first size of FIG. 6 may correspond to the micro lens ML1 having the first size of FIG. 2.

Comparing FIG. 6 with FIG. 3, four phase detection pixels may share the micro lens 601 having the first size instead of two phase detection pixels sharing the micro lens 301 having the first size. Similarly, a description of FIG. 6 mainly focuses on its difference from FIG. 3, and portions of FIG. 6 that are similar to FIG. 3 are either briefly described or omitted.

Referring to FIG. 6, the pixel array 122 may include a first pixel group 610, a second pixel group 620 positioned in the +x direction of the first pixel group 610, a third pixel group 630 positioned in the +y direction of the first pixel group 610, and a fourth pixel group 640 positioned in the +x direction of the third pixel group 630. In addition, a pixel positioned in a third row and a third column of the first pixel group 610, a pixel positioned in a third row and a first column of the second pixel group 620, a pixel positioned in a first row and a third column of the third pixel group 630, and a pixel positioned in a first row and a first column of the fourth pixel group 640 may be pixels arranged in 2×2, and the four pixels may share the micro lens 601 having the first size. That is, the pixel array 122 may include the micro lens 601 having the first size shared by four phase detection pixels arranged in 2×2.

Also in a case in which the pixel array 122 has a PDAF pattern shown in FIG. 6, PDAF control performance of the electronic device 100 may be improved compared to the PDAF pattern of FIG. 3 or FIG. 4. The image processor 130 may detect all of the following: a phase difference in a left and right direction, a phase difference in an up and down direction, and a phase difference in an oblique direction by using the pixel data obtained from the phase detection pixels. Therefore, the image processor 130 may control the AF by using the phase difference in the left and right direction, the up and down direction, and the oblique direction together.

In the first binning mode, the image sensor 120 may obtain reset data, LT data, LT+LB data, LT+LB+RT data, LT+LB+RT+RB data, and 9 sum data from the first pixel group 610, and may provide the reset data, the LT data, the LT+LB data, the LT+LB+RT data, the LT+LB+RT+RB data, and the 9 sum data to the image processor 130. The image processor 130 may calculate LT data, LB data, RT data, and RB data based on the data received from the image sensor 120 and may control the AF by using the calculated LT data, LB data, RT data, and RB data. In addition, the image processor 130 may obtain the image data by using (9 sum data)−(reset data).

In the second binning mode, the image sensor 120 may vary in its combination of readout phase detection pixels for each row of the pixel array 122. For example, the image sensor 120 may read out the reset data, the LT+LB data, and the 9 sum data from the pixel group of the first row, read out the reset data, the RT+RB data, and the 9 sum data from the pixel group of the second row, read out the reset data, the LT+RT data, and the 9 sum data from the pixel group of the third row, and read out the reset data, the LB+RB data, and the 9 sum data from the pixel group of the fourth row. In this case, the image processor 130 may control the AF by using the LT+LB data, the RT+RB data, the LT+RT data, and the LB+RB data, and may obtain the image data using (9 sum data)−(reset data).

Figure 7:
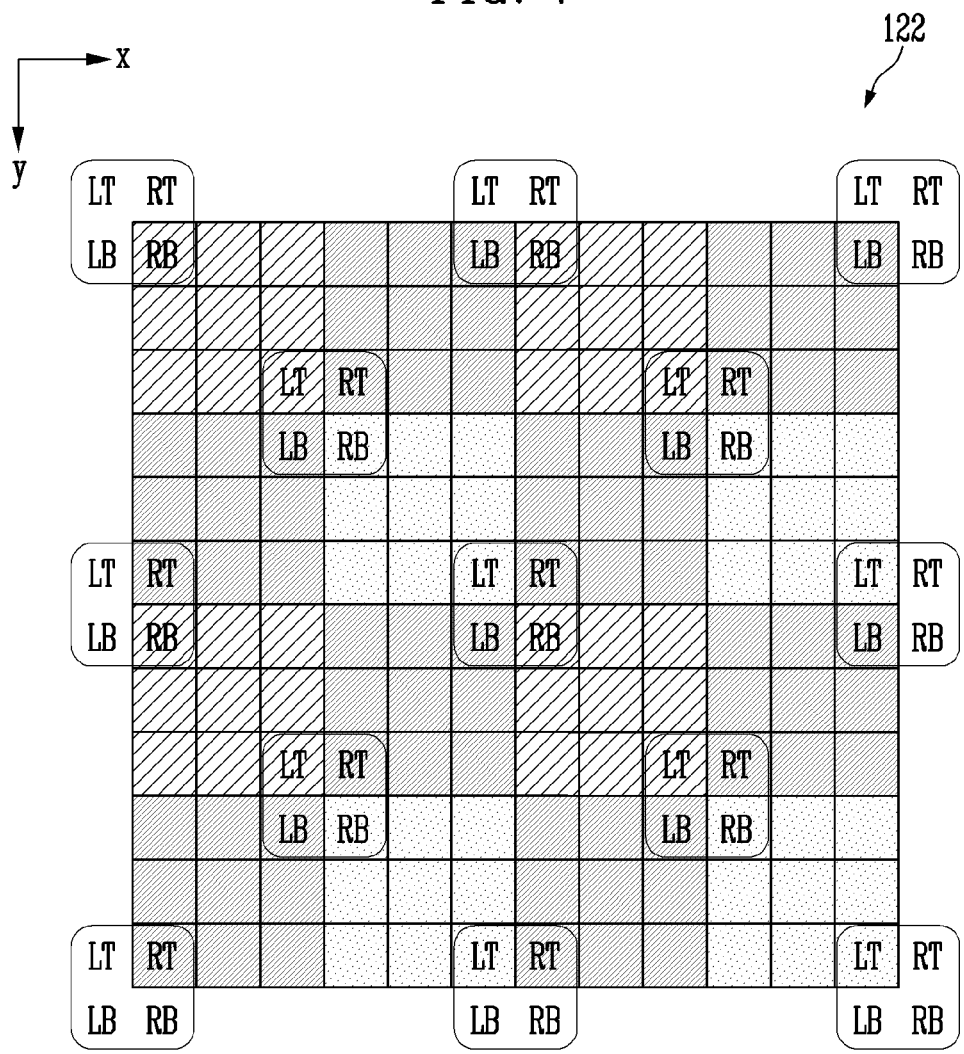
FIG. 7 is a diagram illustrating another example of a pixel array in which pixels arranged in 2×2 share a micro lens according to an embodiment of the present disclosure.

FIG. 7 is a diagram illustrating another example of a pixel array in which pixels arranged in 2×2 share a micro lens according to an embodiment of the present disclosure.

Comparing FIG. 7 with FIG. 6, FIG. 7 may be similar to FIG. 6 except that some of the micro lenses having the first size are excluded. Therefore, a description of FIG. 7 mainly focuses on its difference from FIG. 6, and portions of FIG. 7 that are similar to FIG. 6 are either briefly described or omitted.

Referring to FIGS. 6 and 7, the pixel array 122 may include the micro lenses having the first size disposed at each vertex at which four pixel groups meet and may also include the micro lenses having the first size disposed at only a portion of the vertices. For example, in a PDAF pattern of FIG. 6, the micro lenses having the first size may be disposed at each vertex of each pixel group, and in a PDAF pattern of FIG. 7, the micro lenses having the first size may be disposed at only two vertices, among four vertices of each pixel group. According to FIG. 7, two phase detection pixels may be included in each of the pixel groups included in the pixel array 122. The number of micro lenses having the first size included in the pixel array 122 of FIG. 7 may be about half that of FIG. 6. In addition, the number of phase detection pixels included in the pixel array 122 of FIG. 7 may be about half that of FIG. 6.

Figure 8:
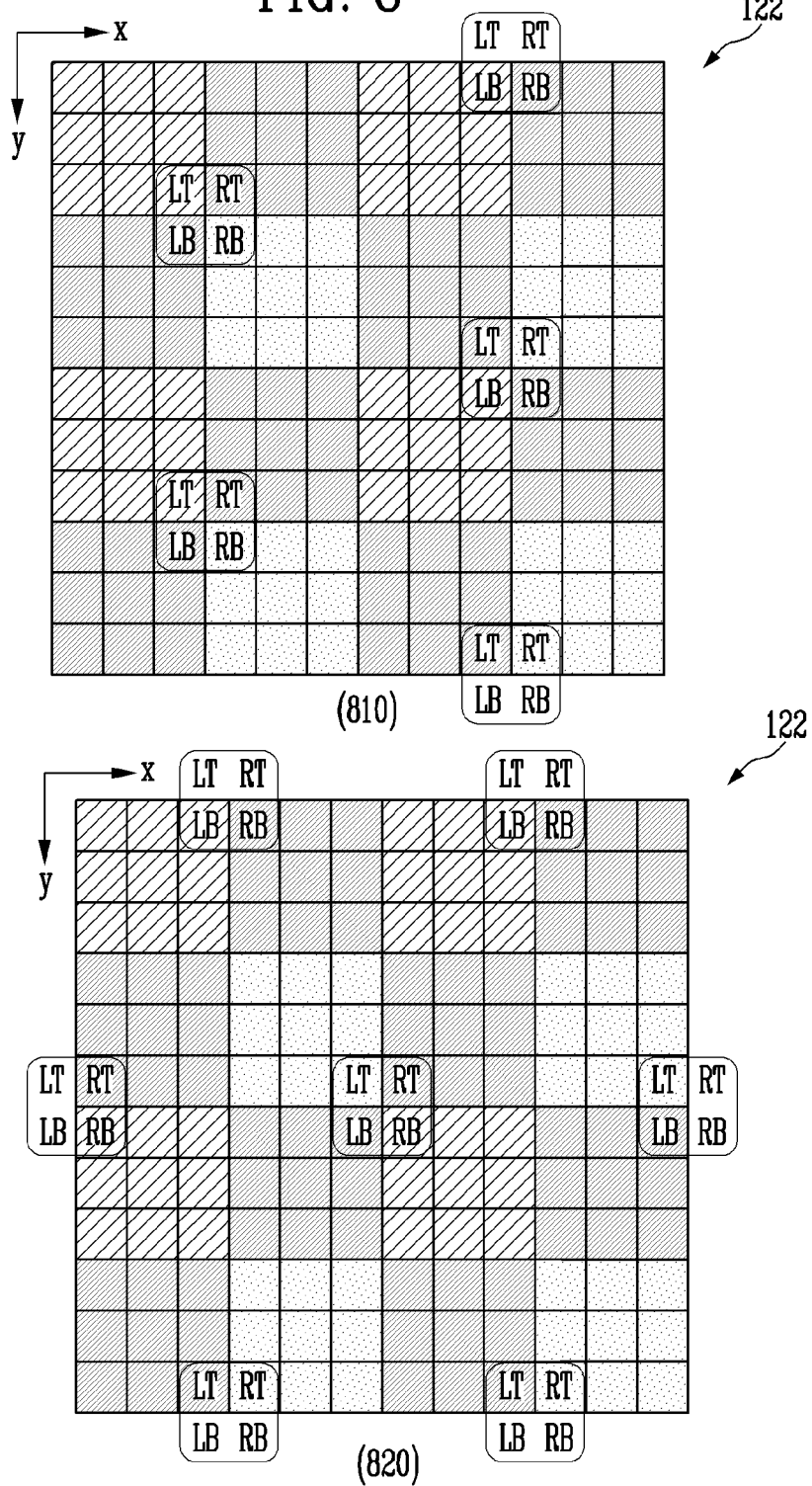
FIG. 8 is a diagram illustrating still another example of a pixel array in which pixels arranged in 2×2 share a micro lens according to an embodiment of the present disclosure.

FIG. 8 is a diagram illustrating still another example of a pixel array in which pixels arranged in 2×2 share a micro lens according to an embodiment of the present disclosure.

FIG. 8 illustrates other examples in which micro lenses having a first size included in the pixel array 122 may be arranged. The pixel array 122 may include the micro lenses having the first size disposed to correspond to a portion of the vertices of the pixel group. For example, the pixel array 122 may include the micro lens having the first size disposed at only one vertex among four vertices of each pixel group, as indicated by reference numeral 810 or 820. According to reference numerals 810 and 820, one phase detection pixel may be included in each of the pixel groups included in the pixel array 122.

In addition to the PDAF patterns shown in FIGS. 6 to 8, various embodiments in which the micro lenses having the first size are disposed in at least a portion of vertex areas of the pixel groups are possible.

Figure 9:
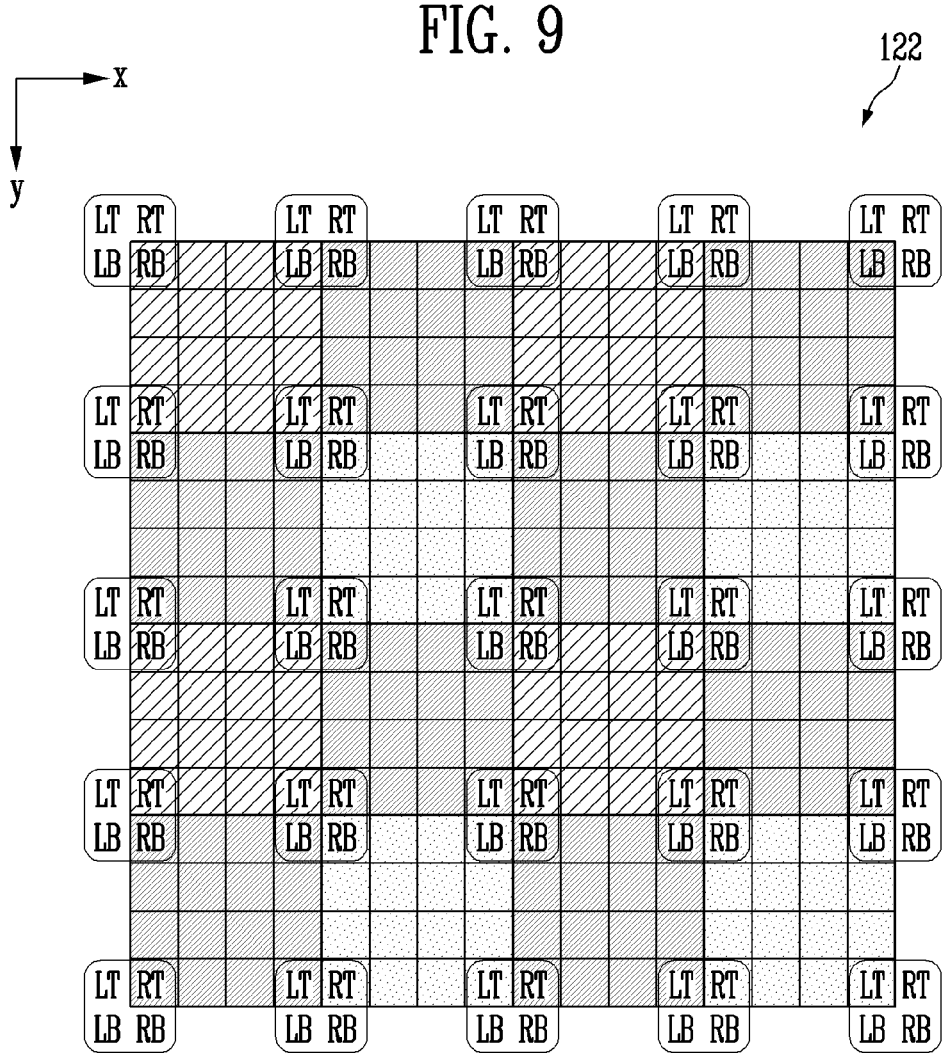
FIG. 9 is a diagram illustrating an example in which pixels arranged in 2×2 share a micro lens when each pixel group includes 4×4 pixels according to an embodiment of the present disclosure.

FIG. 9 is a diagram illustrating an example in which pixels arranged in 2×2 share a micro lens when each pixel group includes 4×4 pixels according to an embodiment of the present disclosure. Portions of FIG. 9 that are similar to FIGS. 3 to 8 are either omitted or simply described.

Referring to FIG. 9, each pixel group included in the pixel array 122 may include 16 pixels arranged in 4×4.

In the first binning mode, the image sensor 120 may obtain reset data, LT data, LT+LB data, LT+LB+RT data, LT+LB+RT+RB data, and 16 sum data from a specific pixel group and may provide the reset data, the LT data, the LT+LB data, the LT+LB+RT data, the LT+LB+RT+RB data, and the 16 sum data to the image processor 130. The image processor 130 may calculate LT data, LB data, RT data, and RB data based on the data received from the image sensor 120 and may control the AF by using the calculated LT data, LB data, RT data, and RB data. In addition, the image processor 130 may obtain the image data by using (16 sum data)–(reset data).

In the second binning mode, the image sensor 120 may vary in its combination of readout phase detection pixels for each row of the pixel array 122. For example, the image sensor 120 may read out the reset data, the LT+LB data, and the 16 sum data from the pixel group of the first row, read out the reset data, the RT+RB data, and the 16 sum data from the pixel group of the second row, read out the reset data, the LT+RT data, and the 16 sum data from the pixel group of the third row, and read out the reset data, the LB+RB data, and the 16 sum data from the pixel group of the fourth row. In this case, the image processor 130 may control the AF by using the LT+LB data, the RT+RB data, the LT+RT data, and the LB+RB data and may obtain the image data by using (16 sum data)–(reset data).

Figure 10:
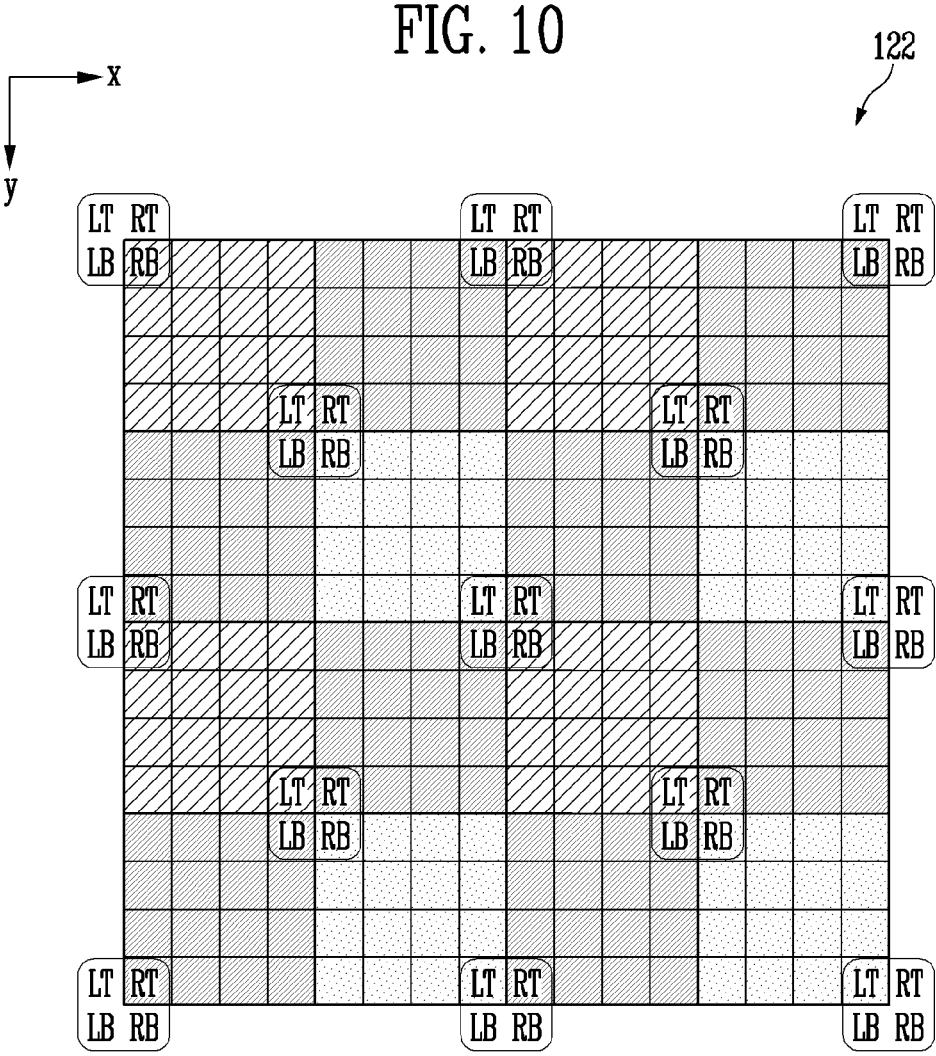
FIG. 10 is a diagram illustrating another example in which pixels arranged in 2×2 share a micro lens when each pixel group includes 4×4 pixels according to an embodiment of the present disclosure.

FIG. 10 is a diagram illustrating another example in which pixels arranged in 2×2 share a micro lens when each pixel group includes 4×4 pixels according to an embodiment of the present disclosure. Portions of FIG. 10 that are similar to FIGS. 3 to 9 are either omitted or simply described.

Referring to FIGS. 9 and 10, the pixel array 122 may include the micro lenses having the first size disposed at each vertex at which four pixel groups meet and may also include the micro lenses having the first size disposed at only a portion of the vertices. For example, in a PDAF pattern of FIG. 9, the micro lenses having the first size may be disposed at each vertex of each pixel group, and in a PDAF pattern of FIG. 10, the micro lenses having the first size may be disposed at only two vertices, among four vertices of each pixel group. According to FIG. 10, two phase detection pixels may be included in each of the pixel groups included in the pixel array 122.

Figure 11:
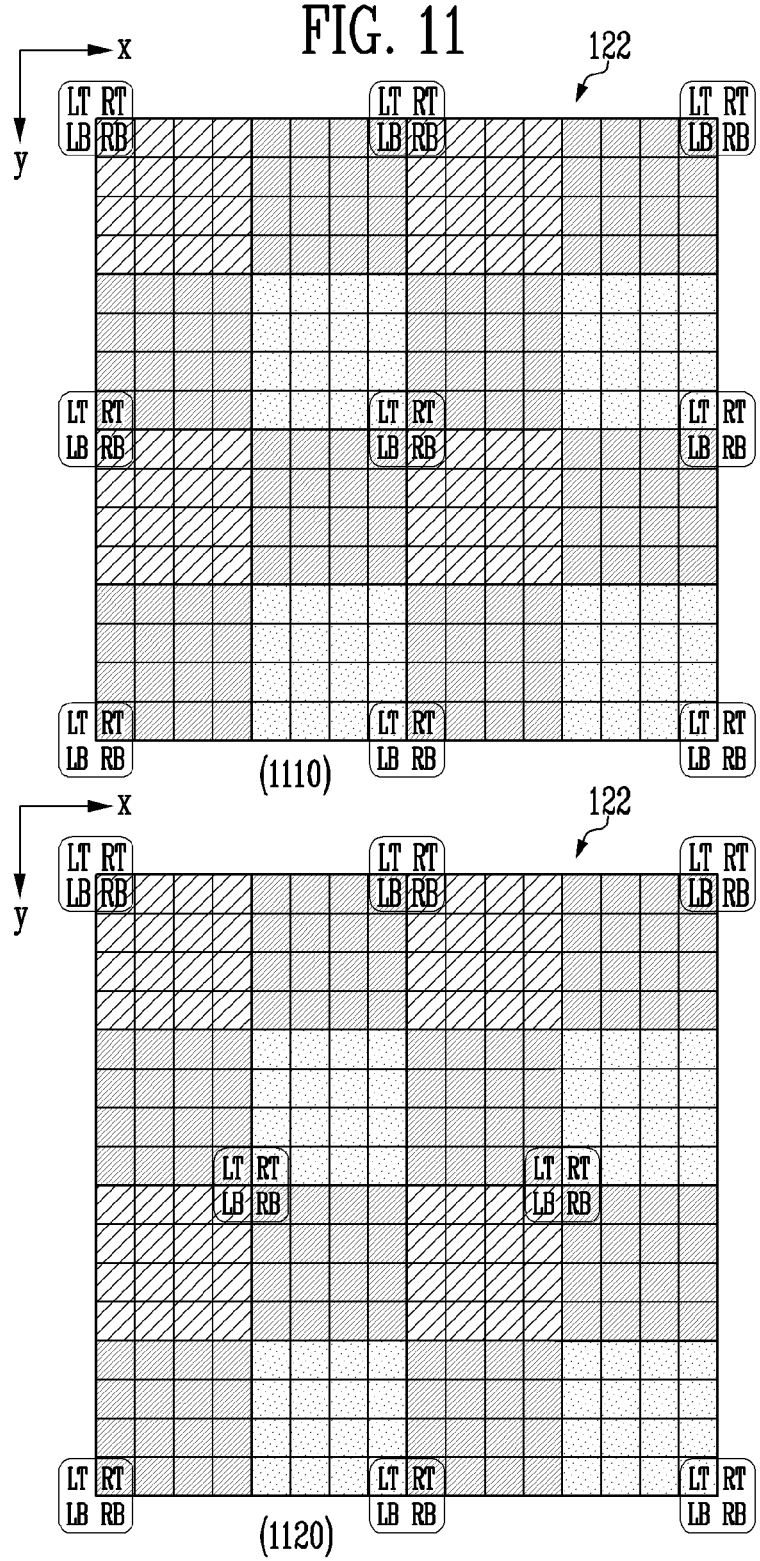
FIG. 11 is a diagram illustrating still another example in which pixels arranged in 2×2 share a micro lens when each pixel group includes 4×4 pixels according to an embodiment of the present disclosure.

FIG. 11 is a diagram illustrating still another example in which pixels arranged in 2×2 share a micro lens when each pixel group includes 4×4 pixels according to an embodiment of the present disclosure. Portions of FIG. 11 that are similar to FIGS. 3 to 10 are either omitted or simply described.

FIG. 11 illustrates other examples in which the micro lenses having the first size included in the pixel array 122 may be arranged. The pixel array 122 may include the micro lenses having the first size disposed to correspond to a portion of the vertices of the pixel group. For example, the pixel array 122 may include the micro lens having the first size disposed at only one vertex, among four vertices of each pixel group, as indicated by reference numeral 1110 or 1120. According to reference numerals 1110 and 1120, one phase detection pixel may be included in each of the pixel groups included in the pixel array 122.

In addition to the PDAF patterns, shown in FIGS. 9 to 11, various embodiments in which the micro lenses having the first size are disposed in at least a portion of vertex areas of the pixel groups are possible. In addition, the technical idea according to the present disclosure may also be applied to a pixel array 122 including pixel groups, each corresponding to 5×5 or more pixels, or a pixel array 122 including pixel groups, each corresponding to pixels arranged in various forms, such as 2×3 and 2×4.

What is claimed is:

1. A pixel array comprising:
   a first pixel group including at least two pixels, each including a color filter corresponding to a first color;
   a second pixel group including at least two pixels, each including a color filter corresponding to a second color, the second color being different from the first color; and
   a third pixel group including at least two pixels, each including a color filter corresponding to the second color,
   wherein the first pixel group is disposed between the second pixel group and the third pixel group,
   wherein a first pixel included in the first pixel group, and a second pixel included in the second pixel group, are disposed adjacent to each other and share a micro lens having a first size, and
   wherein a third pixel included in the first pixel group and a fourth pixel included in the third pixel group are disposed adjacent to each other and share a micro lens having the first size.

2. The pixel array of claim 1, wherein the micro lens having the first size shared by the first and second pixels is disposed to cover the color filter included in the first pixel and the color filter included in the second pixel.

3. The pixel array of claim 1, wherein a fifth pixel included in the first pixel group includes a micro lens having a second size, and
   wherein the micro lens having the second size is disposed to cover the color filter included in the fifth pixel.

4. The pixel array of claim 3, wherein the second size is less than the first size.

5. The pixel array of claim 1, wherein the first pixel group includes nine pixels arranged in 3×3.

6. The pixel array of claim 1, wherein the second pixel group is positioned in a first direction with respect to the first pixel group, and
   the pixel array further comprises:
      a fourth pixel group positioned in a second direction, perpendicular to the first direction with respect to the first pixel group; and
      a fifth pixel group positioned in the first direction with respect to the fourth pixel group.

7. The pixel array of claim 6, wherein a fifth pixel included in the fourth pixel group and a sixth pixel included in the fifth pixel group are arranged in 2×2 together with the first pixel and the second pixel and share the micro lens having the first size together with the first pixel and the second pixel.

8. An electronic device comprising:
   an image sensor including a plurality of pixel groups, each including a phase detection pixel and an image detection pixel, wherein each of first phase detection pixels and first image detection pixels included in pixel groups corresponding to a first color, among the plurality of pixel groups, includes a color filter of the first color, and
   wherein each of the first phase detection pixels shares a micro lens having a first size with a second phase detection pixel included in a pixel group corresponding to a second color, the second color being different from the first color and the second phase detection pixel being adjacent to each of the first phase detection pixels; and
   wherein an image processor configured to control auto focus (AF) based on phase difference data obtained from the first phase detection pixels of the pixel groups corresponding to the first color.

9. The electronic device of claim 8, wherein the image processor controls the AF by using the phase difference data obtained from phase detection pixels included in one pixel group, among the first phase detection pixels.

10. The electronic device of claim 8, wherein the image processor controls the AF by using the phase difference data obtained from phase detection pixels, each corresponding to the first color, but included in different pixel groups, among the first phase detection pixels.

11. The electronic device of claim 8, wherein the phase difference data is phase difference data related to the first color, and wherein the image processor obtains phase difference data related to the second color from the second phase detection pixels of the pixel groups corresponding to the second color and controls the AF based on phase difference data related to the first color and phase difference data related to the second color.

12. The electronic device of claim 8, wherein the micro lens having the first size is disposed to cover two or more phase detection pixels included in different pixel groups and adjacent to each other, among the phase detection pixels of the pixel groups.

13. The electronic device of claim 8, wherein the image processor obtains image data based on pixel data received from the phase detection pixel and the image detection pixel.

14. The electronic device of claim 13, wherein the image processor:

receives, from the image sensor, a first type of pixel data obtained through the phase detection pixel and a second type of pixel data obtained through the image detection pixel, obtains the phase difference data based on the first type of pixel data, and obtains the image data based on the first type of pixel data and the second type of pixel data.

\* \* \* \* \*